(12) United States Patent
Apte et al.

(10) Patent No.: US 7,781,049 B2
(45) Date of Patent: Aug. 24, 2010

(54) HYDROGEN TRANSPORT MEMBRANE FABRICATION METHOD

(75) Inventors: Prasad S. Apte, E. Amherst, NY (US); Joseph Michael Schwartz, Williamsville, NY (US); Shawn W. Callahan, Tonawanda, NY (US)

(73) Assignee: Praxair Technology, Inc., Danbury, CT (US)

( * ) Notice: Subject to any disclaimer, the term of this patent is extended or adjusted under 35 U.S.C. 154(b) by 49 days.

(21) Appl. No.: 12/411,543

(22) Filed: Mar. 26, 2009

(65) Prior Publication Data

US 2009/0214844 A1    Aug. 27, 2009

Related U.S. Application Data

(62) Division of application No. 11/273,543, filed on Nov. 15, 2005, now Pat. No. 7,531,215.

(51) Int. Cl.
*B32B 3/26* (2006.01)
(52) U.S. Cl. .................. 428/216; 428/304.4; 428/316.6; 428/318.4; 428/319.1
(58) Field of Classification Search ........................ None
See application file for complete search history.

(56) References Cited

U.S. PATENT DOCUMENTS

| | | | |
|---|---|---|---|
| 4,609,562 A | 9/1986 | Isenberg et al. |
| 6,066,592 A | 5/2000 | Kawae et al. |
| 6,372,165 B1 | 4/2002 | Apte et al. |
| 6,761,929 B2 | 7/2004 | Damle |
| 6,899,744 B2 | 5/2005 | Mundschau |
| 2002/0020298 A1 | 2/2002 | Drost et al. |
| 2002/0141919 A1 | 10/2002 | Alvin |
| 2003/0003233 A1 | 1/2003 | Damle |

(Continued)

FOREIGN PATENT DOCUMENTS

EP    1277512 A1    1/2003

(Continued)

OTHER PUBLICATIONS

Cheng, Y.S. et al., "Performance of Alumina, Zeolite, Palladium, Pd-Ag Alloy Membranes for Hydrogen Separation from Towngas Mixture", Journal of Membrane Science 204 (2002) pp. 329-340.

(Continued)

*Primary Examiner*—Ling Xu
(74) *Attorney, Agent, or Firm*—David M. Rosenblum

(57) ABSTRACT

A hydrogen transport membrane in which a porous ceramic support supports a dense layer of palladium or an alloy of palladium serving as a hydrogen transport material. The ceramic support has a first porous layer and a second porous layer. The first porous layer has a first thickness of about 1 mm, a first set of pores have a first average pore size of between about 10 microns and about 50 microns and a first porosity of about 40 percent by volume. The second porous layer has a second thickness of about 3 microns, a second set of pores having a second average pore size of between about 10 nanometers and about 100 nanometers and a second porosity of about 50 percent by volume. The dense layer has a thickness of about 3 microns.

4 Claims, 3 Drawing Sheets

U.S. PATENT DOCUMENTS

2003/0183080 A1    10/2003    Mundschau
2004/0021240 A1    2/2004    Chen et al.
2005/0241477 A1*   11/2005    Mundschau et al. ............ 95/56

FOREIGN PATENT DOCUMENTS

EP    1547673 A1    6/2005
JP    2002153740    5/2002
WO    WO2005/065806 A1    7/2005

OTHER PUBLICATIONS

McCool, B. et al., "Composition Control and Hydrogen Permeation Characteristics of Sputter Deposited Palladium-Silver Membranes", Journal of Membrane Science 161 (1999) pp. 67-76.

Tosti, S. et al., "Sputtered, Electroless, and Rolled Palladium-Ceramic Membranes", Journal of Membrane Science 196 (2002) pp. 241-249.

* cited by examiner

HYDROGEN TRANSPORT MEMBRANE FABRICATION METHOD

RELATED APPLICATIONS

This application is a divisional of prior U.S. application Ser. No. 11/273,543, filed Nov. 15, 2005 now U.S. Pat. No. 7,531,215.

FIELD OF THE INVENTION

The present invention relates to a hydrogen transport membrane having a thin layer of a hydrogen transport material, for example, palladium or an alloy of palladium, supported on a porous ceramic support having two porous layers.

BACKGROUND OF THE INVENTION

Composite hydrogen transport membranes are used to separate hydrogen from a hydrogen containing feed for a variety of industrial processes. Such membranes can consist of a hydrogen transport material supported by a porous support. It is believed that such membranes function by diffusing the hydrogen to a surface of the membrane then disassociating the hydrogen molecules to hydrogen ions and electrons. The hydrogen ions and electrons are transported through the membrane and at an opposite surface of the membrane, the hydrogen molecules recombine and gain the electrons. Hydrogen then diffuses away from such opposite surface of the membrane.

Such hydrogen transport membranes are fabricated from palladium or alloys of palladium containing silver and function at high temperatures under the driving force of pressure. The flux of the hydrogen developed through the membrane is in part dependent upon the diffusion resistance of the membrane, the pressure applied and the temperature to which the membrane is subjected.

In order to reduce the diffusion resistance through the membrane, the membrane should be made as thin as possible so as to provide the shortest path of diffusion for the hydrogen through the membrane. Since, as stated above, such hydrogen transport materials are subjected to a driving force of pressure, thin layers of hydrogen transport material must be supported on a porous support, typically a ceramic.

In the prior art, hydrogen transport materials have been supported within the pores of the ceramic, solely on the surface of the ceramic or a combination of both methods of support. For example, in U.S. Pat. No. 6,066,592, both methods of support are used. In fabricating the membrane in accordance with the teachings of this patent, one surface of a porous support is immersed in a solution containing a sensitized metal so that pressure can be applied to one surface that is higher than the pressure of the opposite surface of the support. The pressure forces the sensitized metal to be deposited not only on the surface of the support but also on inner surfaces of the pores. Thereafter, an electroless plating technique is carried out utilizing a plating solution containing a reducing agent to deposit palladium onto the porous support so that the metal fills the pores and closes them.

In U.S. Pat. No. 6,899,744, a hydrogen transport membrane is formed in which a saturated solution of palladium chloride is placed on one side of a porous support and a water soluble organic reducing agent is placed on the opposite side of the support. The reagents diffuse through the porous support and react to deposit palladium in the pores.

A disadvantage of a membrane formed in a manner that involves filling the pores of a support with the hydrogen transport material is that the distance for the hydrogen to diffuse is greater than that possibly attainable with a thin metallic coating of material on the support. Additionally, the diffusion resistance of the hydrogen through the support has invariably increased due to the plugging of the pores.

U.S. Pat. No. 6,761,929 discloses a method of producing a coating of the hydrogen transport material on a support in which the degree to which the material penetrates the pores is controlled by pressurizing the surface of the support that is located opposite to the surface that is to be plated by an electroless plating technique. In this manner, a hydrogen transport material is not able to penetrate the pores and a uniform thickness of material is able to develop at the surface of the support. A problem with this technique is that it presents a limitation in the ability to obtain very thin layers of hydrogen transport materials. The reason for this is that as hydrogen transport material bridges the pores, such material is also being deposited at locations of the supporting support situated between the pores.

As will be discussed, the present invention relates to a method of forming a hydrogen transport membrane in which porosity of the support is maintained in an open condition while very thin, defect-free hydrogen transport material layers are able to be produced at the surface of the support.

SUMMARY OF THE INVENTION

In one aspect, the present invention provides a method of forming a hydrogen transport membrane to separate hydrogen from a hydrogen containing feed. In accordance with such method, a porous ceramic support is formed having opposed surfaces. Isolated deposits of a metal are produced on one of the opposed surfaces. The isolated deposits of the metal bridge pores within the porous ceramic support without penetrating the pores and without bridging regions of the one of the opposed surfaces defined between the pores. A dense layer of the palladium or the palladium alloy is formed on the one of the opposed surfaces of the porous ceramic support and after having formed the isolated deposits of the metal. As used herein and in the claims, a "dense layer" is a layer with no interconnected through porosity extending from one surface to the other.

The isolated deposits of the metal are produced by an electroless plating process that involves cleaning, activating and sensitizing the one of the opposed surfaces and then, contacting the porous ceramic support on the other of the opposed surfaces with a precipitating agent so that the precipitating agent fills the pores but does not seep out of the pores onto the regions of the one of the opposed surfaces defined between the pores. The one of the opposed surfaces is then contacted with a salt solution containing a salt of the metal so that said metal precipitates and produces the isolated deposits of the metal.

As can be appreciated, when the salt solution contacts the ceramic support, it only precipitates upon contact with the precipitating agent which is located in the pores. Thus, regions of the ceramic support located between pores are not coated at such time nor will the precipitated metal penetrate into the pores. Since the pores have been bridged, when the layer of hydrogen transport material is applied to the surface of the ceramic support, the metal bridging the pores will prevent defects from forming in the membrane and therefore, very thin layers of hydrogen transport material are able to be applied and while leaving the pores of the ceramic support in an open condition to allow for diffusion of the hydrogen through the ceramic support.

Preferably, the porous ceramic support can be formed by forming a first porous layer having a first set of pores and forming a second porous layer on the first porous layer having a second set of pores. The second set of pores have a smaller average pore size than said first set of pores and the second porous layer forms the one of the opposed surfaces of the porous ceramic support. The first porous layer is formed by isostatically pressing a mixture comprising a granular ceramic material and pore formers to produce a green form and then firing the green form to burn out the pore formers and to sinter the ceramic material to form the first porous layer. The first porous layer is then dip coated with a colloidal suspension containing ceramic particles having a smaller average particle size than the granular ceramic material used in forming the first layer. Thereafter, the first porous layer, coated with the colloidal suspension is fired to sinter the ceramic particles and thereby to form the porous second layer.

The ceramic granules and the ceramic particles can consist of a mixture of zirconium oxide containing about 8 mole percent yttrium oxide. The metal can be the palladium and the dense layer can be a palladium silver alloy. The dense layer can be formed by continuing the electroless plating process to form an initial palladium layer and thereafter depositing successive layers of silver and the palladium by successive electroless plating processes utilizing salts of silver and palladium, respectively. Thereafter, the initial layer of the palladium and the successive layers of the silver and the palladium are annealed to form the palladium silver alloy.

Preferably, the first porous layer has a first thickness of preferably 1 mm. The first set of pores can have a first average pore size of between about 10 microns and about 50 microns and a first porosity of about 40 percent by volume.

The second porous layer can have a second thickness of about 3 microns. The second set of pores can have a second average pore size of between about 10 nanometers and about 100 nanometers and a second porosity of about 50 percent by volume. The initial palladium layer can have an initial thickness of about 0.5 microns and the successive layers have successive thicknesses of about 1.0 microns and about 2 microns, respectively. After annealing, the dense layer has a third thickness of 3 microns. As used herein and in the claims, "pore size" is a quantity determined by microscopic analysis and "porosity" is a quantity determined by measuring the volume fraction of the pores by infiltrating the pores with a fluid such as mercury and measuring the volume of the fluid.

In another aspect, the present invention is a hydrogen transport membrane that includes a ceramic support having a first porous layer and a second porous layer. The first porous layer has a first thickness of about 1 mm. Additionally, the first porous layer has a first set of pores having a first average pore size of between about 10 microns and about 50 microns and a first porosity of about 40 percent by volume. The second porous layer can have a second thickness of about 3 microns. The second porous layer is provided with a second set of pores having a second average pore size of between about 10 nanometers and about 100 nanometers and a porosity of about 50 percent. The dense layer can be formed of palladium or an alloy of palladium situated on the second porous layer and having a third thickness of about 3 microns. The ceramic support can be formed of yttrium stabilized zirconia containing about 8 mole percent yttrium and the dense layer can be a silver alloy of palladium containing about 25 percent by weight silver. The hydrogen transport membrane can be in the form of a closed-end tube having the dense layer on an outer surface thereof.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

DETAILED DESCRIPTION

Figure 1:
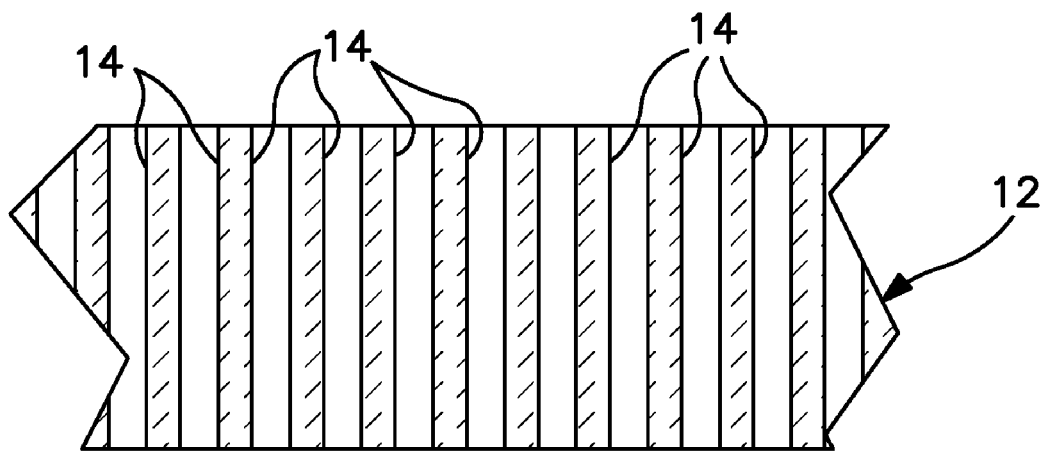
FIG. 1 is a schematic illustrating an initial stage of a method in accordance with the present invention.
Figure 2:
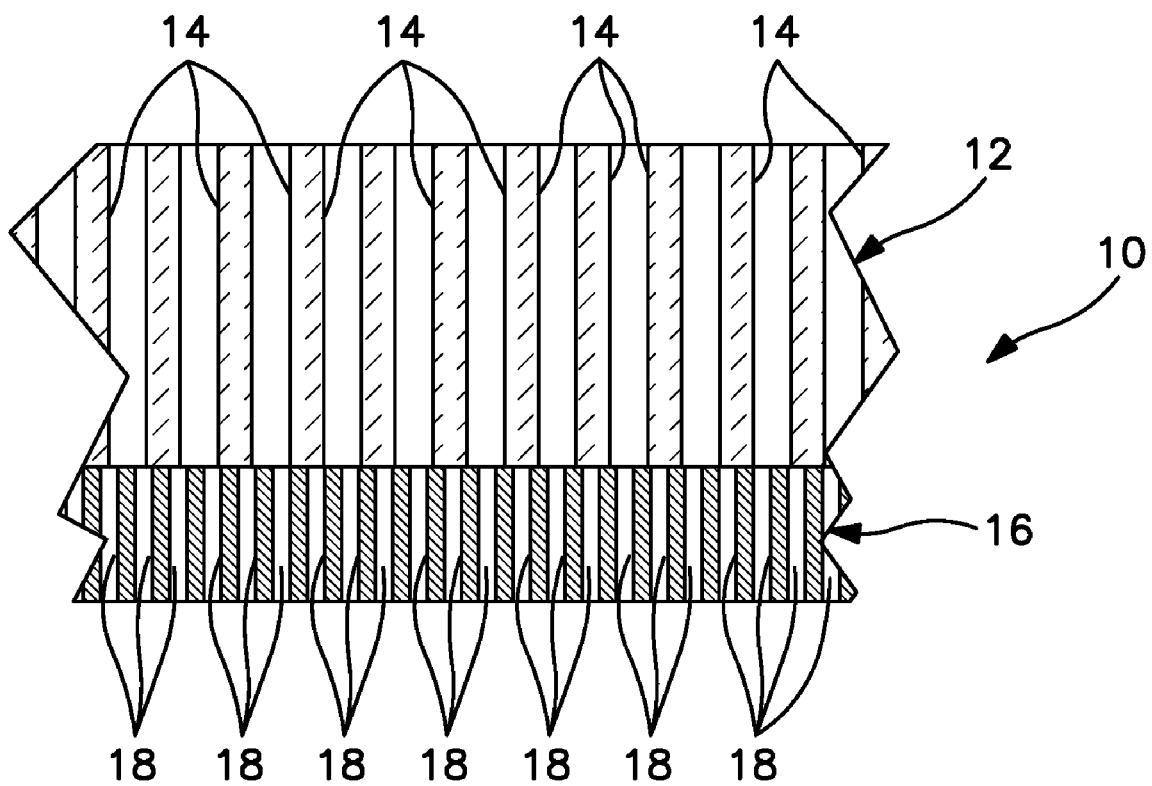
FIG. 2 is a schematic illustrating a stage of a method in accordance with the present invention that subsequent to the stage illustrated in FIG. 1.

With reference to FIGS. 1 and 2, a hydrogen transport membrane is formed by first forming a porous ceramic support 10 that will be used in supporting a hydrogen transport material made up of palladium or an alloy of palladium. Porous support 10 is formed by first producing a first porous layer 12 having a first set of pores 14 and then forming a second porous layer 16 having a second set of pores 18 on the first porous layer 12. As shown in the illustration, the second set of pores 18 has a smaller pore size than first set of pores 14. This allows a large open area to be provided adjacent to the hydrogen transport material by virtue of the second porous layer 16 and an increased pore size of first porous layer 12 to minimize diffusion resistance of the hydrogen to be separated through the porous support 10.

It is to be noted that although first set of pores 14 and second set of pores 18 are shown as being cylindrical bores, preferably, the structure is an interconnected network of passages having a tortuosity and porosity as known in the art. Although two layers are shown, as would also be known to those skilled in the art, there could be multiple layers or only a single layer in such supporting structure.

Porous support 10 can be of any shape but is preferably in the form of a closed end tube. For example, planar configurations are also possible.

Although there are many applicable and known techniques that can be used in forming ceramic support 10, preferably, first porous layer 12 is formed by isostatically pressing a mixture that comprises granular ceramic material and pore formers to produce a green tubular form. A known isostatic pressing technique involves filling a cylindrical mold with such mixture. The mold has a mandrel projecting into the cylinder. The mold, after having been sealed, is then subjected to a hydrostatic pressure to compact the particles. The resulting green tubular form is then fired to burn out the pore formers and to sinter the ceramic particle and thereby to form first porous layer 12.

Second porous layer 16 is preferably formed on first porous layer 12 by known dip coating techniques in which a slurry containing finer ceramic particles than those used in forming first porous layer 12 is produced. First porous layer 12 is then dipped into the slurry and allowed to dry. This dipping can take place several times. The coated first porous layer 12 is then fired to sinter the fine ceramic particles and thereby to form second porous layer 16. Other known techniques can be possibly used such as isopressing a tape containing the finer ceramic particles onto the first porous layer 12 and then subjecting the resultant composite to a firing schedule to sinter the fine ceramic particles.

Figure 3:
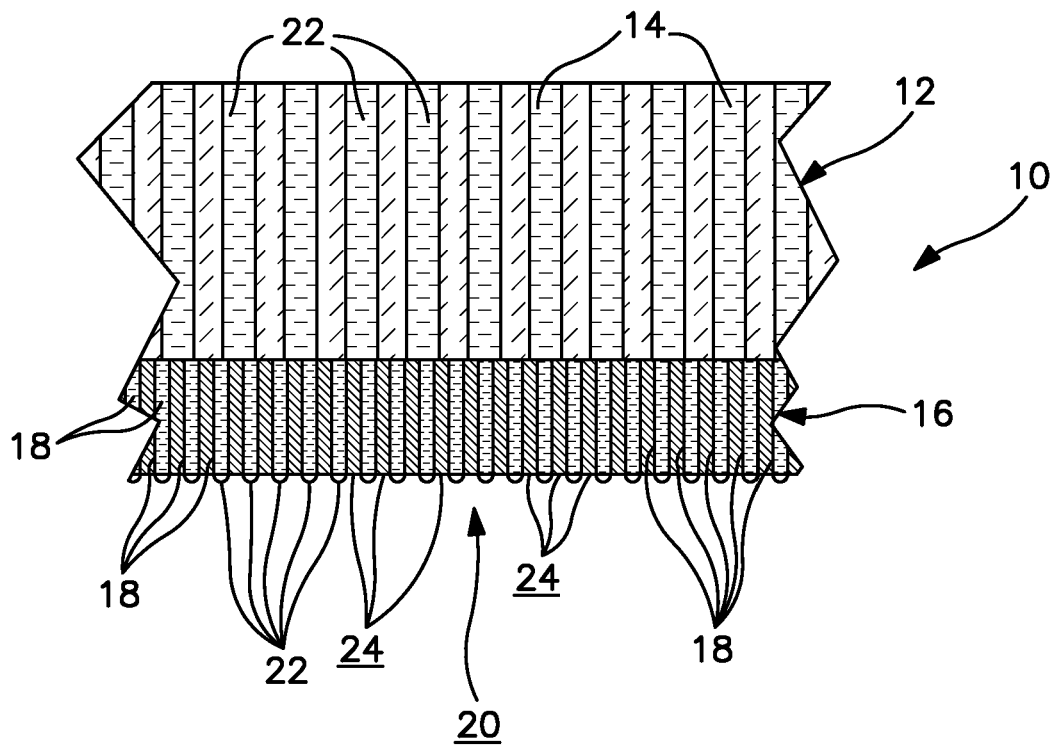
FIG. 3 is a schematic illustrating a stage of a method in accordance with the present invention that subsequent to the stage illustrated in FIG. 2.
Figure 4:
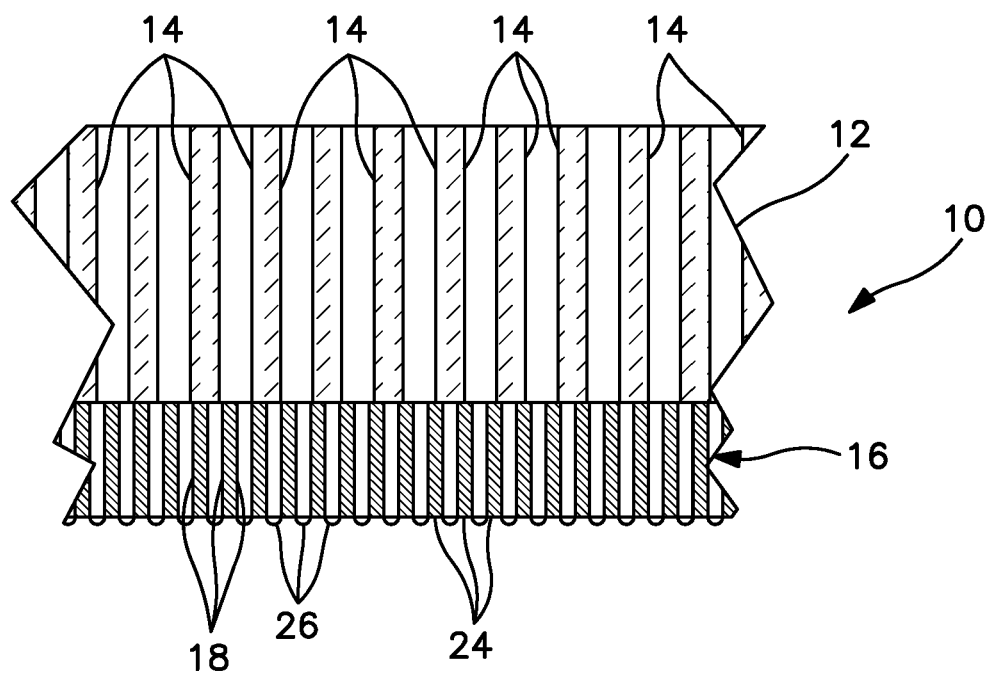
FIG. 4 is a schematic illustrating a stage of a method in accordance with the present invention that subsequent to the stage illustrated in FIG. 3.
Figure 5:
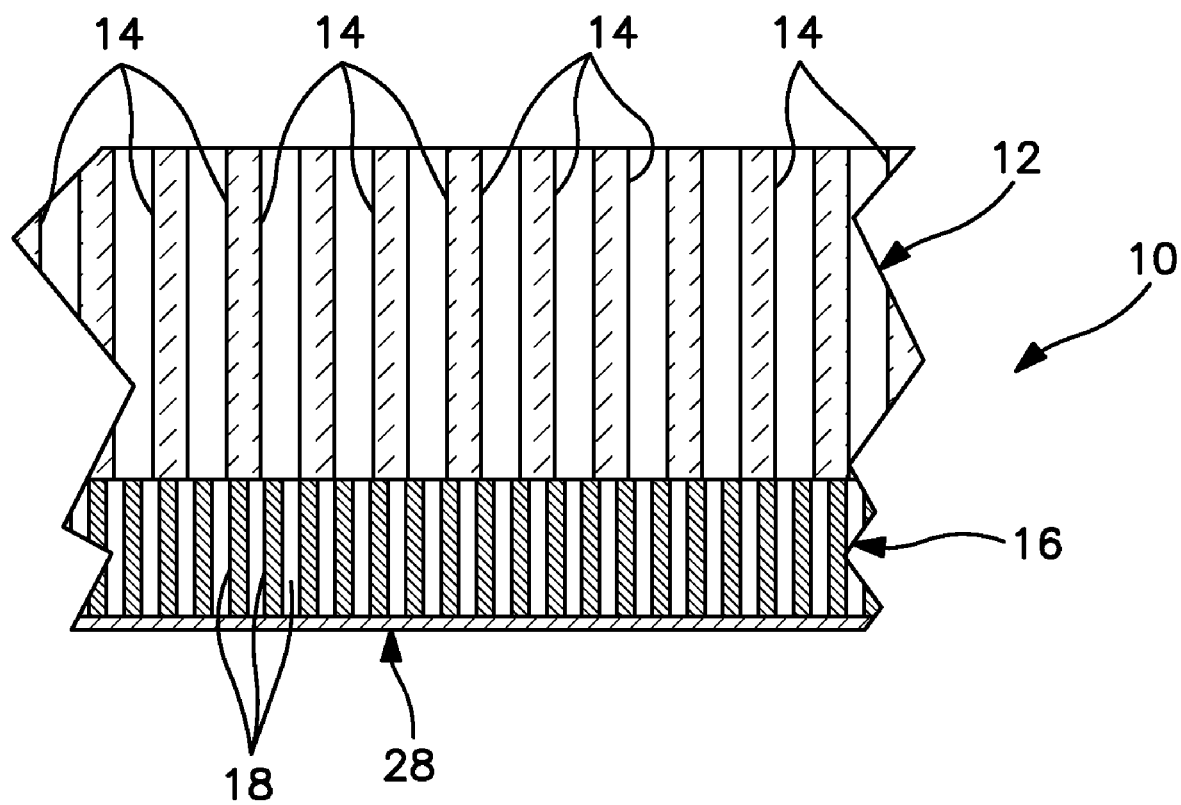
FIG. 5 is a schematic illustrating a stage of a method in accordance with the present invention that subsequent to the stage illustrated in FIG. 4.

With reference to FIG. 3, porous support 10 is subjected to an electroless plating process in which a surface 20 thereof is cleaned, sensitized and activated. Thereafter, the surface of porous support 10 located opposite to surface 20 is contacted with a precipitating agent 22 so that the same fills the first set of pores 14 and the second set of pores 18 and appears at a surface 20 of porous ceramic support 10 but does not seep out to regions 24 defined between the second set of pores 18. Thereafter, the surface 20 is contacted with a salt solution that contains palladium, a palladium alloy or a component of the palladium alloy (the hydrogen transport material). The result of such contact is illustrated in FIG. 4. Isolated deposits of a metal 26 (palladium, the alloy of palladium or a component of the alloy) are formed on surface 20, bridging the second set of pores 18, without penetrating the second set of pores 18 and without bridging regions 24.

Thereafter, a dense layer 28 is formed on surface 22. Dense layer 28 can be made very thin but without defects. Preferably dense layer 28 is formed by continuing the electroless plating technique used in forming the isolated deposits of metal 26. As will be discussed below with respect to an example of carrying out the present invention, successive layers of palladium alloy components can optionally be plated onto an initial layer of the metal. For example, the initial layer can be palladium followed by successive silver and palladium layers. The layered structure is then annealed to form the palladium alloy. Alternatively, dense layer 28 could consist of palladium alone. Other known ways of forming dense layer 28 could be employed such as chemical vapor deposition. Electroless plating has an advantage over other techniques in that it allows dense layer 28 to be formed on an inside surface of a tubular form of a membrane in accordance with the present invention. In such case, the isolated deposits of the metal 26 would be formed inside the tubular form prior to depositing dense layer 28.

The following is a theoretical example of a manner of carrying out a method in accordance with the present invention.

The porous ceramic support 10 can be made of zirconium oxide containing about 8 mole percent [8 m %] yttrium oxide. Such powder is available from a wide variety of sources and preferably has a mean particle diameter of about 0.5 micrometers. The powder can be spray granulated after adding 5 weight percent of a binder such as poly vinyl alcohol. The granulated powder such as described above can have a granule size distribution as follows. About 8 wt % are finer than about 10 microns, about 20.2% are finer than about 50 microns and about 95% are finer than about 28 microns. This mixture of granules flows very easily and is considered desirable for isostatic compaction to yield long, thin walled, about 1 mm thick, tubular structures. The granules can be screened through a 200 mesh screen to eliminate large clumps formed in storage and then the granules are mixed with a fugitive pore former. The preferred pore former is zinc stearate having a mean particle size of about 15 microns. The granules and the pore former can be blended in a ratio of about 88/12 by weight and mixed in a NALGENE jar for 24 hours.

After mixing, the powder is fed into an annular space between a steel core or mandrel about 0.08 cm in diameter and a polyurethane tube having an inner diameter of about 1.4 cm. Here the target is a pressed tube of about 11 mm in outer diameter. The powder, core, and polyurethane tube assembly is covered with a polyurethane cap and submerged in a water filled tank of an isostatic press. The water is pressurized to yield a pressure of between about 275 MPa on the tube. After compaction the pressure is released and the mold is separated from the tube.

The tube is placed in a furnace for sintering. The tube is heated in air to about 450° C. at a rate of about 1° C./min. The temperature is maintained at about 450° C. for about 4 hours. The tube is then further heated to about 1450° C. at the same rate and held at that temperature for 4 hours. Subsequently the tube is cooled to room temperature and removed from the furnace. At this point the tube will have shrunk to an outside diameter of about 9.25 mm and a porous microstructure is produced having a pore size will be produced ranging from between about 10 microns and about 50 microns, a wall thickness of about 1 mm and a porosity of about 40 percent by volume.

Second porous layer 16 can then be applied with the use of a colloidal suspension of Zirconia. The colloidal suspension can be made by ball milling a mixture containing about 280 gm of ceramic powder (as described above), about 80 gm of a binder obtained from The Ferro Corporation of Cleveland, Ohio, United States of America and sold as "FERRO B 73210" binder and about 400 gm of liquid medium, for example toluene. The powders are ball milled with Zirconia beads having a diameter of about 1.5 mm to aid the mixing, for 24 hours. The suspension is poured into a long cylindrical tube and allowed to stand for no less than about 10 minutes to allow larger particles to settle out. The closed end of the tube that constitutes first porous layer 12 is then dipped into the colloidal suspension to the desired depth and the tube is then retracted out of the cylindrical container. The tube is allowed to dry for at least about 10 minutes. It is then dipped as before until the colloidal layer built up to about 0.12 to about 0.16 gm per linear centimeter of tube length for a tube of the aforementioned diameter.

The tube is sintered in a furnace in air. The sintering schedule is the same as for the tubular isostatic compaction used in forming first porous layer 12 but the maximum temperature is 1150° C. After the tube is cooled it should be inspected and absent any major defects it is ready for the next stage of processing. The second layer 16 formed after sintering has much finer pores (second set of pores 18) than first layer 12 and such pores range from about 10 nanometers to about 100 nanometers and exhibit a porosity of 60 percent by volume. Second layer 16 has a thickness of about 3 micron after such processing. The finished ceramic support 10 made in accordance with the aforesaid process has an outer diameter of about 10 mm and is about 200 mm in length. First set of pores 14 are situated on the inside of the tube and the second set of pores 16 are located on the outside of the tube or ceramic support 10.

The ceramic support 10 is then cleaned by circulating a 0.1 N sodium hydroxide through the support tube for 15 minutes followed by circulating a 0.1 N hydrochloric acid solution through the ceramic support 10 for 15 minutes and then circulating deionized water through the ceramic support 10 for 15 minutes. About 250 mL of each solution was used for each component and the circulation rate was approximately 50 ml/min. This cleaned the ceramic support of contaminants that were introduced as a result of the successive firings. The support is then sensitized using a 1 g/l solution of tin chloride in a 0.2 N hydrochloric acid and activated using 0.09 g/l solution of palladium chloride in 0.2 N hydrochloric acid. For the sensitization and activation process, the sensitization solution is first circulated through the support tube for about 5 minutes, followed by circulation of the activation solution for about 5 minutes and then circulation of deionized water for about 1 minute. The sensitization/activation process is repeated 4 times. The ceramic support 10 is then dried in an oven at 120° C. for two hours.

Once the external surface of ceramic support 10 was sensitized and activated, the inside of ceramic support 10 is filled with a solution of hydrazine of about 10 mL/L. The hydrazine acts as a precipitating agent. Once the hydrazine appears at the surface 20, without coating the surface, support 10 is immersed in a bath containing about 5.4 g/L of palladium chloride, 390 ml/l of a 5N ammonium hydroxide solution, and about 40 g/l of ethylene diamine tetraacetic acid ("EDTA"). The plating process is then allowed to continue for 60 minutes. In such plating process, the hydrazine flows outward through the second set of pores 18 and emerges on the surface 20. There it encounters the salt solution and the two react to deposit palladium on the surface 20 so that the palladium bridges the second set of pores 18 without penetrating the same and thus forms the isolated deposits 22. This is aided by the surface tension of the hydrazine solution which helps form the thin sheet-like deposits on the surface. The process continues until the palladium deposits have bridged the pores. Contact between the hydrazine and the salt solution is now broken and the reaction ceases.

Ceramic support 10 can then be removed from the salt solution and the hydrazine solution poured out of ceramic support 10. After the drying, ceramic support 10 can then be checked for leaks with pressurized air. If ceramic support 10 is not leak tight, the process as aforesaid can be repeated.

The ceramic support 10 is now ready for deposition of more palladium and/or silver and palladium as needed to obtain the desired thickness of the dense layer 28.

An example of a dense layer 28 made from palladium alone follows. A standard electroless plating bath composition was used for palladium plating on the porous support 10 and consisted of about 5.4 g/l of palladium chloride, about 390 ml/l of 5N ammonium hydroxide solution, about 40 g/l of ethylene diamine tetraacetic acid, and about 10 ml/l of 1M hydrazine solution. About 185 ml of the bath composition was prepared for a single plating of palladium on ceramic support 10. All components were mixed together first, except for the hydrazine, which was added just before starting the circulation of the plating solution. The plating bath solution was circulated at a rate of approximately 50 cc/min. The corresponding velocity of the solution in the tube was about 2 cm/sec. The circulation was continued for 1.5 hours at ambient temperature of about 22° C. The support was then rinsed by circulating deionized water for 10 minutes, dried in an oven at 120° C. for two hours. Uniform palladium deposition will have a thickness of about 1 micron.

An example of applying a palladium silver alloy as a dense layer 28 is as follows. A single plating operation, as described above, can be conducted for 1.5 hours to obtain an initial palladium layer of approximately 0.5 microns thickness. Once the palladium layer is confirmed to be dense, a successive layer of silver can be deposited on the palladium layer having a thickness of about 1 microns. The silver layer in turn can be covered with another layer of palladium having a thickness of about 2 microns. The amount of silver and palladium deposited is such that the final separation layer has about 25 wt % of silver in the film. After the deposition process was completed, the tube can be annealed at 650° C. in a nitrogen atmosphere to form a silver palladium alloy. The nitrogen atmosphere had a pressure ranging from between about 1 to about 5 psig. After annealing dense layer 28 has a thickness of about 3 microns.

The palladium salt used in this example is a chloride but a nitrate could also be employed. The silver salt used was silver nitrate. The composition of the various solutions used above is an example and the following table indicates the ranges of concentrations which could be employed.

TABLE

| No. | Component | Lower limit | Upper limit | Preferred concentration |
|---|---|---|---|---|
| 1 | [NH3]4PdCl2 | 0.35 g/l | 15 g/L | 5.4 g/L |
| 2 | Na2[EDTA] | 20 g/L | 60 g/L | 40 g/L |
| 3 | NH4OH [5N] | 200 ml/L | 500 ml/L | 390 ml/L |
| 4 | Hydrazine | 2.5 ml/L | 40 ml/L | 10 ml/L |

It has been reported that the minimum separation layer thickness needed for making a gas tight film is about three times the size of the largest pore on the support surface. As is apparent from the above discussion, the process of the present invention permits the formation of a thinner separation layer.

While the present invention has been described with reference to a preferred embodiment, as will occur to those skilled in the art, numerous, changes, additions and omissions may be made without departing from the spirit and scope of the present invention.

We claim:

1. A hydrogen transport membrane comprising:
   a ceramic support having a first porous layer and a second porous layer;
   the first porous layer has a first thickness of about 1 mm, a first set of pores have a first average pore size of between about 10 microns and about 50 microns and a first porosity of about 40 percent by volume;
   the second porous layer has a second thickness of about 3 microns, a second set of pores having a second average pore size of between about 10 nanometers and about 100 nanometers and a second porosity of about 50 percent by volume; and
   a dense layer formed of an alloy of palladium situated on the second porous layer and having a third thickness of about 3 microns.

2. The hydrogen transport membrane of claim 1, wherein the ceramic support is formed of yttrium stabilized zirconia containing about 8 mole percent yttrium and the dense layer is a silver alloy of palladium containing about 25 percent by weight silver.

3. The hydrogen transport membrane of claim 2, wherein the ceramic support and the dense layer are in the form of a closed-end tube having the dense layer on an outer surface thereof.

4. The hydrogen transport membrane of claim 1, wherein the ceramic support and the dense layer are in the form of a closed-end tube having the dense layer on an outer surface thereof.

* * * * *